United States Patent
Sills et al.

(10) Patent No.: US 7,116,222 B2
(45) Date of Patent: Oct. 3, 2006

(54) COMBINATION MAGNETIC TAG

(75) Inventors: Colin S Sills, Cambridge (GB);
Timothy S Norris, Saffron Waldon (GB)

(73) Assignee: BTG International Limited, London (GB)

( * ) Notice: Subject to any disclaimer, the term of this patent is extended or adjusted under 35 U.S.C. 154(b) by 28 days.

(21) Appl. No.: 10/487,359

(22) PCT Filed: Aug. 15, 2002

(86) PCT No.: PCT/GB02/03776

§ 371 (c)(1),
(2), (4) Date: Apr. 9, 2004

(87) PCT Pub. No.: WO03/019502

PCT Pub. Date: Mar. 6, 2003

(65) Prior Publication Data

US 2004/0189459 A1    Sep. 30, 2004

(30) Foreign Application Priority Data

Aug. 21, 2001   (GB) ................................. 01203058

(51) Int. Cl.
*G08B 1/08*    (2006.01)

(52) U.S. Cl. .............. 340/539.22; 340/551; 340/572.5; 340/10.1; 340/5.86; 283/70; 283/82; 713/176

(58) Field of Classification Search ........... 340/539.22, 340/572.3, 572.4, 10.1, 572.5, 551, 555–557, 340/5.86; 283/70, 79, 82, 85; 713/153, 713/170; 73/176

See application file for complete search history.

(56) References Cited

U.S. PATENT DOCUMENTS

| | | | |
|---|---|---|---|
| 4,098,935 A | | 7/1978 | Knudsen |
| 4,630,845 A | * | 12/1986 | Sanner ........................ 283/91 |
| 5,477,219 A | | 12/1995 | Zarembo et al. |
| 5,666,417 A | * | 9/1997 | Liang et al. .................. 283/92 |
| 5,756,220 A | | 5/1998 | Hoshino et al. |
| 5,821,859 A | | 10/1998 | Schrott et al. |
| 5,965,214 A | | 10/1999 | Crossfield et al. |
| 5,974,150 A | * | 10/1999 | Kaish et al. ................. 713/179 |
| 6,131,718 A | * | 10/2000 | Witschorik .................. 194/206 |

FOREIGN PATENT DOCUMENTS

| | | |
|---|---|---|
| DE | 44 35 695 A | 4/1996 |
| EP | 0 340 034 A2 | 11/1989 |
| EP | 0 340 034 B1 | 11/1989 |

\* cited by examiner

*Primary Examiner*—Davetta W. Goins
(74) *Attorney, Agent, or Firm*—Nixon & Vanderhye

(57) ABSTRACT

A combination magnetic tag (10) is described comprising an optical part (20) and a magnetic part (30), the optical part including a plurality of optical elements for conveying an optical code and the magnetic part including a plurality of magnetic elements for conveying a magnetic code, the optical and magnetic codes being mutually complementary for verifying authenticity of the tag (10). Incorporation of both optical and magnetic codes into the tag is of advantage in that they are capable of rendering the tag less susceptible to copying. The tag (10) is relevant to appropriate to anti-counterfeiting applications.

27 Claims, 3 Drawing Sheets

COMBINATION MAGNETIC TAG

This application is the U.S. National Phase of International Application PCT/GB02/03776, filed Aug. 15 2002, which designated the U.S.

FIELD OF THE INVENTION

The present invention is concerned with combination tags; in particular but not exclusively, the invention in concerned with a combination magnetic tag comprising an optical part and a magnetic part, the optical and magnetic parts being mutually complementary. Moreover, the invention is also concerned with a method of programming the combination tag. Furthermore, the invention is further concerned with a method of interrogating the combination tag.

BACKGROUND TO THE INVENTION

Optical tags, for example bar codes, are well known. They are widely used for labeling consumer products in retailing premises such a supermarkets. Moreover, they have received widespread acceptance on account of their low cost and the ease with which they can be interrogated using scanned laser beams. In many cases, such bar codes are of printed form and an integral part of product package labeling, for example on paper sleeves around packaged food items. Alternatively, in other cases, the optical tags are retrospectively added to package labels by way of non-contact ink-jet printing.

Optical tags have the disadvantage that they are often susceptible to being copied with relative ease. Such copying can render it difficult to determine the authenticity of counterfeit merchandise bearing similar optical bar codes to corresponding genuine merchandise. In order to address this difficulty, some types of optical tag are arranged to be a covert part of existing labels or product graphical design detail, for example as in documents of value such as bank notes or bills of exchange. For example, it is known to incorporate optical tag features as part of a picture on labels, the picture appearing normal to the human eye and the optical tag features being subtly incorporated so that they are not discernible on cursory human visual inspection.

The inventors of the present invention have appreciated that there exists a need for optical tags which are more difficult to copy and provide a higher degree of authenticity validation to products onto which they are affixed or are an integral part.

SUMMARY OF THE INVENTION

According to a first aspect of the present invention, there is provided a combination magnetic tag comprising an optical part and a magnetic part, the optical part including a plurality of optical elements for conveying an optical code and the magnetic part including a plurality of magnetic elements for conveying a magnetic code, the optical and magnetic codes being mutually complementary for verifying authenticity of the tag.

The invention is of advantage in that incorporation of both optical and magnetic codes into the tag is of advantage in that they are capable of rendering the tag less susceptible to copying.

The tag is especially appropriate for anti-counterfeiting applications.

Preferably, the optical elements comprise one of more of bar code elements and 2-dimensionally disposed dot elements. Both these types of elements are readily susceptible to optical interrogation and are compatible with contemporary optical readers and scanners.

More preferably, the magnetic elements comprise one or more of magnetic layers and magnetic wires. Magnetic layers are of advantage in that they can be readily and cheaply produced in sheet form in bulk. Conversely, magnetic wires are capable of providing particularly well defined corresponding magnetic easy axes providing enhanced magnetic readability.

Preferably, the magnetic elements are substantially randomly distributed on the tag. Random distribution of the magnetic elements on the tag is capable of rendering the tag with a unique identity which renders its more difficult to copy and counterfeit. More preferably, the magnetic elements are randomly distributed with respect to their angular orientation, length and coercivity.

Alternatively, in order to ensure commonality between tags where such commonality is of benefit, the magnetic elements are preferably spatially regularly disposed on the tag.

Preferably, the magnetic elements are fabricated from a magnetically soft material susceptible to magnetic saturation when magnetically interrogated. Such magnetically soft material is capable of functioning as a magnetic switch when subjected to an interrogating magnetic field, thereby generating coupled magnetic fields which can be detected, thereby rendering the elements magnetically readable.

In order to impart the tag with additional information, the optical elements are preferably multicoloured. Thus, the optically elements can be of mutually different colour if required.

The tag is preferably relatively inexpensive so that it can be used in application where the use of RFID tags would be prohibitive. Thus, the tag is preferably fabricated from inexpensive materials. Preferably, therefore, the magnetic and optical elements are formed onto one or more substrates comprising one or more of plastics material and wood-based material.

When encoding the tag, it is desirable that the optical and magnetic codes are complementary and related. Thus, the optical and magnetic codes are preferably arranged to mutually correlate.

In order to render the tag authenticatable to third parties, such parties are preferably provided with a public key. When such public keys are provided, it is especially preferred that the magnetic code is encoded using a private key of a public-private key pair to generate the optical code.

According to a second aspect of the present invention, there is provided a method of interrogating a tag according to the first aspect of the invention, the method including the steps of:

(a) magnetically interrogating the tag to read its magnetic code;

(b) optically interrogating the tag to read its optical code; and (c) correlating the read magnetic code with the read optical code to determine correspondence therebetween and thereby establish whether or not the tag is authentic.

The method is of advantage in that it renders the tag readily readable to verify its authenticity by way of applying correlation.

According to a third aspect of the present invention, there is provided a method of interrogating a tag according to the first aspect of the invention, the method including the steps of:
- (a) magnetically interrogating the tag to read its magnetic code;
- (b) optically interrogating the tag to read its optical code; and
- (c) decoding the read optical code using the magnetic code to generate decoded optical data and then correlating the read magnetic code with the decoded optical data to determine correspondence therebetween and thereby establish whether or not the tag is authentic.

According to a fourth aspect of the present invention, there is provided a method of fabricating a tag according to the first aspect of the present invention, the method including the steps of:
- (a) providing a plurality of substrates in continuous strand form;
- (b) depositing magnetic elements onto one of the strands to form a magnetic strand;
- (c) bonding other of the strands to the magnetic strand to form a composite strand;
- (d) severing the composite strand into individual tags;
- (e) magnetically interrogating the individual tags to determine their corresponding magnetic codes;
- (f) printing onto the individual tags optical codes corresponding to and/or correlatable with their magnetic codes.

The method is of advantage in that it enables mass production of tags on a continuous basis to be achieved, thereby reducing tag costs.

Preferably, the method is arranged in step (b) to deposit the magnetic elements randomly.

Preferably, the magnetic elements are randomly distributed with respect to their angular orientations, their coercivities and their lengths, It will be appreciated that any of the features of the invention can be combined in any combination.

DESCRIPTION OF THE DIAGRAMS

Embodiments of the invention will now be described, by way of example only, with reference to the following diagrams in which.

DESCRIPTION OF EMBODIMENTS OF THE INVENTION

Figure 1:
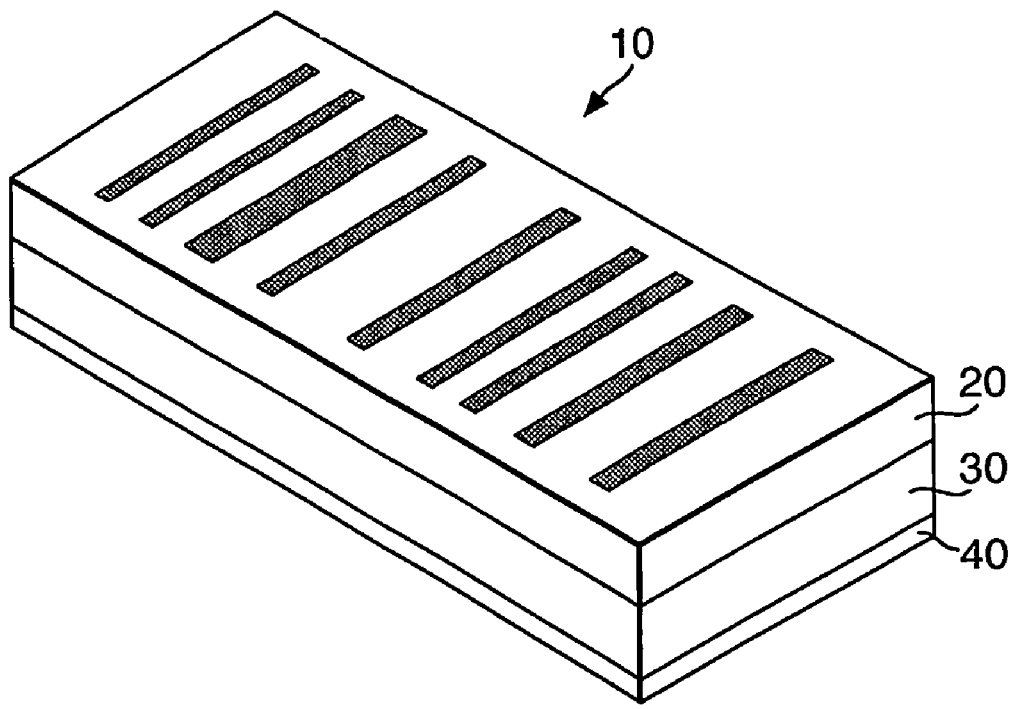
FIG. 1 is a schematic illustration of a combination tag according to the invention, the tag including an optical part and a magnetic part.

Referring to FIG. 1, there is shown a schematic illustration of a combination tag according to the invention; the tag is indicated generally by 10. The tag 10 comprises an optical part 20, a magnetic part 30 and a mounting layer 40. The layer 40 is preferably an adhesive film for attaching the tag 10 to product surfaces.

The optical part 20 is arranged to be exposed and hence visible when the tag 10 is affixed or incorporated into a product. The part 20 incorporates features such as a conventional linear bar code comprising a series of printed black bars on a white background, the bars having widths and a spatial distribution on the part 20 for conveying optical code data. Alternatively, or additionally, a 2-dimensional distribution of dot-like features is included, the 2-dimension spatial distribution of the dots being used to convey optical code data If desired, the dots and/or the bars can be of mutually different colours so that code data is conveyed in both dot/bar spatial position, dot/bar colour and dot/bar width.

The magnetic part 30 is constructed in a similar manner to tags described in published patent applications, for example in international PCT applications no. PCT/GB99/00081 and PCT/GB00/03092. The magnetic part 30 comprises a plurality of magnetic elements, the elements being implemented as one or more of magnetic layers and magnetic wires. Each element has associated therewith an easy axis along which the element is most easily magnetized. On account of the elements being fabricated from a magnetically soft material chosen to saturate at relatively low magnetising levels, for example in the order of 5 A/m, the elements are capable of coupling a low-frequency interrogating magnetic field applied thereto into high frequency magnetic field components; low frequency in this context preferably means in the order of 30 to 250 Hz whereas high frequency preferably means in the order of 500 Hz to 100 kHz. Thus, the elements are capable of being interrogated by using a low-frequency rotationally scanning magnetic field to cause cyclical magnetic saturation of the elements and corresponding generation of high-frequency saturation magnetic field components there at, and then detecting the high-frequency magnetic fields generated by the elements.

The magnetic part 30 comprises a plurality of such elements whose magnetic easy axes are arranged in mutually different angular orientations. Each element has associated therewith magnetic characteristics which can be described by a way of a coercivity parameter, an element easy-axis orientation parameter and a length parameter. The coercivities and angular parameters impart the magnetic part 30 with magnetic code data which can be determined by interrogating the elements using the aforesaid scanning magnetic field.

The tag 10 can be manufactured using a number of methods.

In a first method, the magnetic part 20 and the optical part 30 are fabricated concurrently and then bonded together. The mounting layer 40 is then applied. Next, the magnetic part 20 is magnetically interrogated to determine its inherent magnetic code and then a complementary optically-readable code is printed or formed onto the optical part 20.

In a second method, the magnetic part 20 is fabricated and its magnetic code read by magnetic interrogation. A corresponding optically-readable code is devised which complements the magnetic code. The optically-readable code is then written onto the optical part 20 which is then bonded onto the magnetic part. The mounting layer 40 is then added to the magnetic part 30. Alternatively, the mounting layer 40 is added to the magnetic part 30 prior to the magnetic part 30 being attached to the optical part 20.

The combination tag 10 includes code data both in optical and magnetic formats which renders the tag 10 useful as a counterfeiting measure where only optical coding is expected by counterfeiters. Interrogation of the tag 10 involves both an optical interrogation phase and a magnetic interrogation phase. The optical phase and the magnetic phase can be performed simultaneously. Conversely, they can be performed sequentially with either the magnetic phase or the optical phase first.

There are several strategies that can be adopted to encode the tag 10.

In a first strategy, the magnetic part 30 is manufactured to have a random code, namely the magnetic elements of the magnetic part 30 are deposited, for example by way of a turbulent air flow conveying the elements onto an adhesive-coated tag substrate, in mutually different angular orientations; the elements preferably have mutually different magnetic coercivities, mutually different lengths and mutually different angular orientations. Moreover, the elements can be one or more of magnetic layers and magnetic wires susceptible to magnetic saturation at relatively low magnetising field strengths.

Thus, each tag 10 will have a corresponding magnetic part 30 bearing a potentially unique magnetic data code associated therewith. For example, an $i^{th}$ tag in a series of n tags, where i is an integer in a range of 1 to n, has associated therewith a magnetic code $A_i$, $C_i$, $L_i$ where A, C and L are parameters representative of element angular orientations, element coercivities and element dipole lengths respectively of the $i^{th}$ tag. The magnetic part 30 is then magnetically read to determine $A_i$, $C_i$, $L_i$ using a magnetic reader as described in the foregoing. An optical random code $O_i$ corresponding to the magnetic code is then computed such that:

$$O_i = F(A_i, C_i, L_i) \qquad \text{Eq. 1}$$

where F is a mapping function.

In a simple case, the optical code $O_i$ is simply identical to the magnetic code, namely one or more of $A_i$, $C_i$ and $L_i$, together with a product identifier and a product serial number.

Thus, when the tag 10 is employed for authentication purposes, the optical part 20 is read, for example using a conventional optical laser scanner, to determine the serial number, the product identifier and the optical random code $O_i$ and then the magnetic part 30 is read, for example using a magnetic scanner as described in the foregoing, to determine one or more of $A_i$, $C_i$ and $L_i$. A checking algorithm is then applied to correlate the optical code $O_i$ with one or more of $A_i$, $C_i$, and $L_i$; if successful correlation occurs, the tag 10 and its associated product are deemed to be authentic.

In a more complicated case, one or more of the product identifier and the serial number are encoded by an encoding function using one or more of $A_i$, $C_i$, $L_i$, as encoding parameters to provide encoded data which is then recorded on the optical part 20. When reading the tag 10 encoded in such a manner, the magnetic part 30 is initially read to determine its magnetic code, namely one or more of $A_i$, $C_i$, $L_i$. Then the optical part 20 is read to determine its optical code $O_i$. The optical code $O_i$ is then transformed using the magnetic code to decode one or more of the serial number, the product code. Finally, a verification part of the optical code $O_i$ is correlated with one-or more of $A_i$, $C_i$, $L_i$ to check for authenticity of the tag 10 and its associated product to which it is affixed. The more complicated case is of advantage in that the product serial number and product type are not immediately discernable by simple visual inspection which makes counterfeiting more difficult.

If required, private-public key encoding can be applied to the tag 10. In such a scheme, a pair of complementary encoding keys, namely first and second encoding fees, are generated by a mathematical algorithm. The keys are arranged so that a hostile party having knowledge of one of the keys cannot derive the other key therefrom. Moreover, one of the keys can be used to encode data and the other key used to decode the data Furthermore, the keys cannot be used individually to both encode and decode data within the scheme.

Thus, users of the tag 10 are provided with the first key which is denoted as a public key. The magnetic part 30 is fabricated during manufacture to have a random magnetic code. The magnetic code is subsequently read using a magnetic reader and encoded with the second key which is kept secret and not divulged to users; the second key thereby remains a private key. The magnetic code encoded by the private key is then optical written into bar code or dot form onto the optical part 20 as an optical code.

When the user receives the tag 10 encoded using the private key, the tag 10 for example being affixed to a high added value product such as a lap-top PC or PC software, the user reads the optical code from the tag 10 and then decodes it using the public key to generate corresponding decoded data The user then reads, using a magnetic tag reader, the magnetic code from the tag 10 and correlates this with the decoded optical data. If the magnetic code and the decoded optical data correlate correctly, the tag 10 and its associated product are deemed to be authentic.

The generation of private-public keys is described in a published U.S. patent application U.S. Pat. No. 4,264,782 (Konheim) which refers to a first publication "Signature and Certification by Coding", M. O. Rabin; IBM Technical Disclosure Bulletin, Vol. 20, no. 8, pp. 3337–3338 (January 1978) and also to a second publication "On digital Signatures and Public-Key Crypto-Systems", M.I.T. Laboratory for Computing Science Report, MIT/LCS/TM-82 (April 1977). The published patent application and the first and second publications are hereby incorporated by reference.

Figure 2:
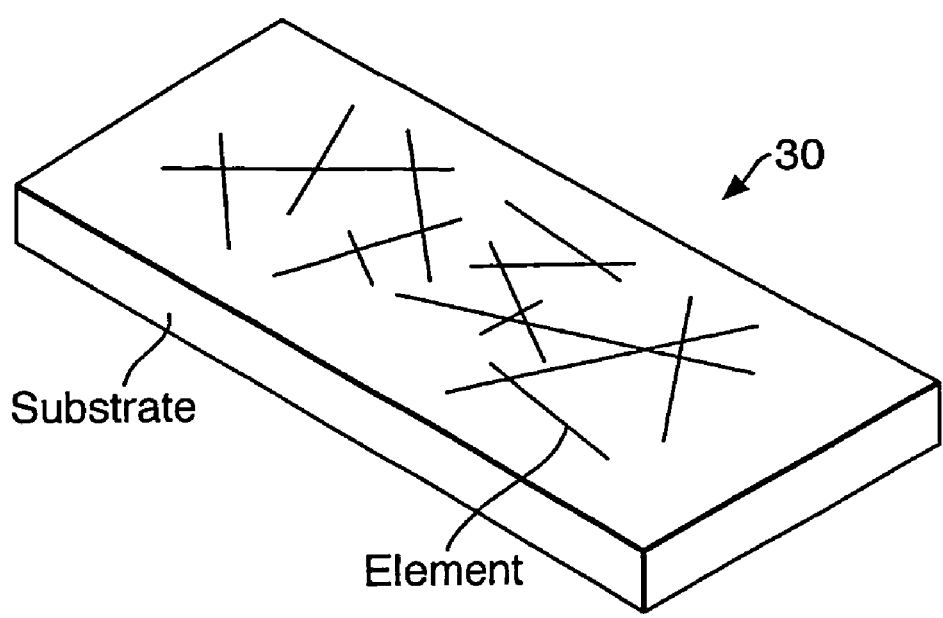
FIG. 2 is a more detailed illustration of the magnetic part in FIG. 1.

Construction of the tag 10 will now be described: with reference to FIGS. 2 and 3. In FIG. 2, the magnetic part 30 is illustrated in more detail. The part 30 comprises a plurality of magnetic elements randomly distributed over a major surface of the part 30. The elements of the tag 10 produced in a production process will be different with regard the element length, coercivity and orientation in comparison to corresponding tags produced before and after the tag 10.

If required, the magnetic part 30 can be arranged to have a defined magnetic code corresponding to intentional ordered positioning of its magnetic elements; for example, if required, the elements can be arranged in a regular pattern such as mutually parallel.

Figure 3A:
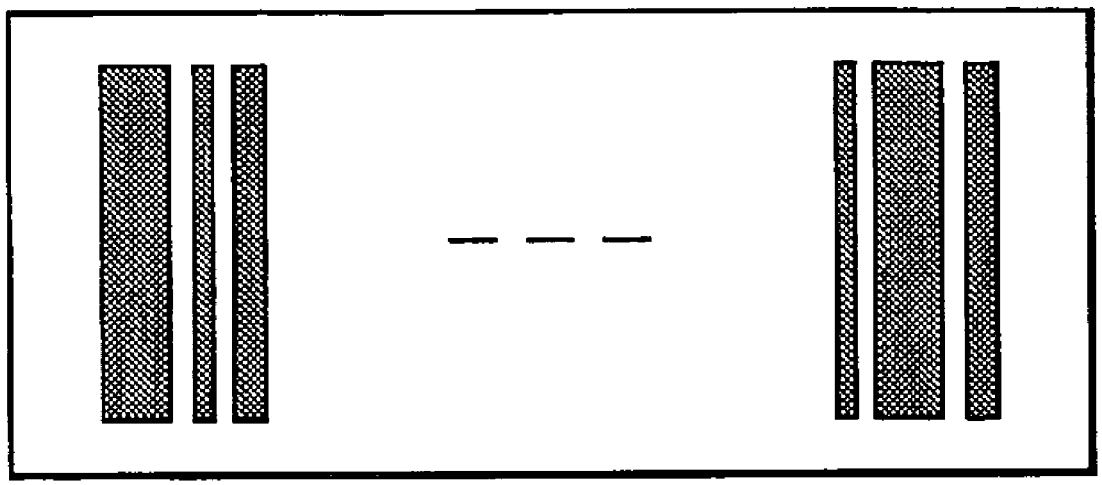
FIG. 3 is a more detailed illustration of the optical part in FIG. 1.
Figure 3B:
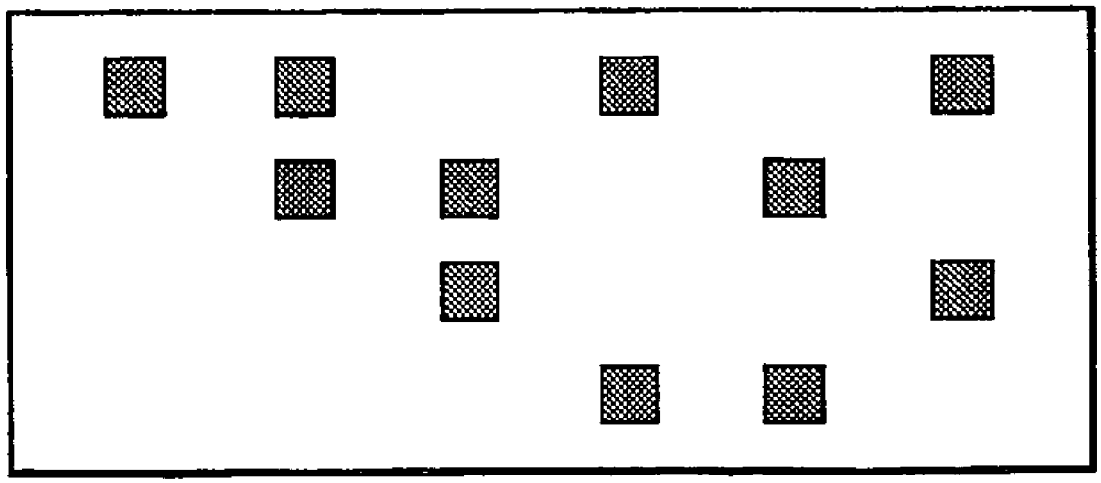

In FIG. 3, the optical part 20 is illustrated as comprising a parallel-line bar code in FIG. 3a and a 2-dimensional dot code in FIG. 3b. As described in the foregoing, the bars and/or the dots can be multicoloured if required to convey additional information.

Figure 4:
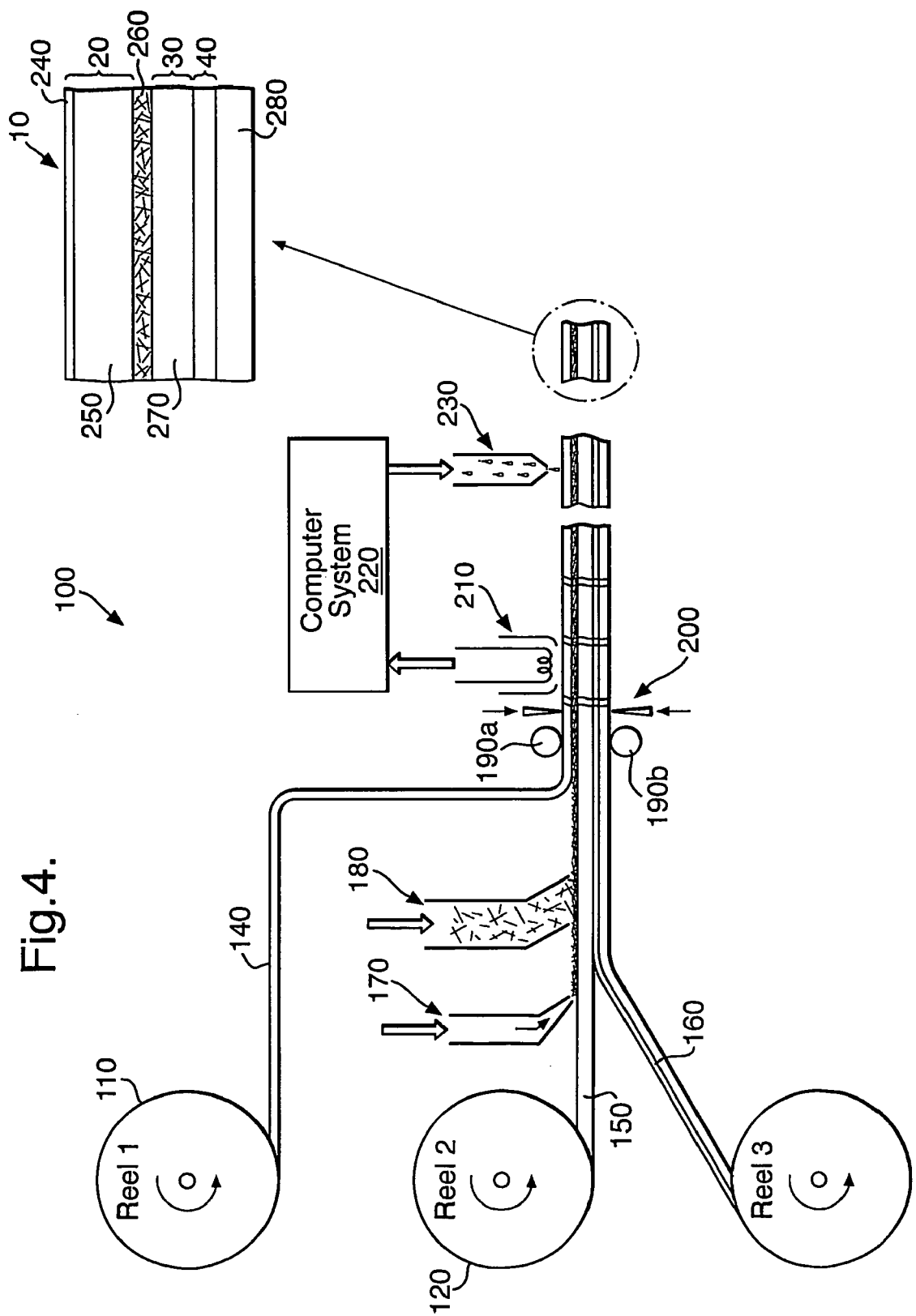
FIG. 4 is a schematic illustration of an apparatus for producing combination tags according to the invention.

Referring now to FIG. 4, there is shown a schematic illustration of a manufacturing apparatus for producing combination tags according to the invention. The apparatus is indicated generally by 100 and comprises first, second and third reels 110, 120 130 respectively. The first, second and third reels 110, 120, 130 accommodate first, second and third continuous strands 140, 150, 160 respectively. The first strand 140 comprises a substrate material, for example a plastics material or a wood-based material such as card or paper, which is susceptible to having optical information such as dots or bar codes printed there onto. Similarly, the second strand 140 comprises a substrate material, for example a plastics material or a wood-based material such as card or paper. The third strand 160 comprises a film of adhesive on a waxed paper backing.

In operation, the apparatus 100 delivers the second strand 150 to an adhesive dispensing device 170 which deposits a film of adhesive onto the strand 160. The strand 160 progresses past the device 170 to a magnetic element dispensing device 180 which is operable to transport magnetic elements, for example elongate fragments of magnetically soft wire, along an air stream and deposit the elements randomly onto the adhesive film into which they become embedded. The apparatus 100 also delivers the first and third strands 140, 160 to a pair of spring-loaded rollers 190a, 190b by way of guides (not shown) together with the second strand 150 from the device 180. The rollers 190a, 190b compress the strands offered thereto together to provide an output combination strand which is subsequently severed into individual tags using a percussive cutting tool 200. The individual tags are then read by a tag reader 210 to determine their magnetic codes which are communicated to a computer system 220. The computer system 220 operates an ink jet printer 230 which prints corresponding optical bar codes onto the tags.

In FIG. 4 (inset), a cross-sectional view of one of the tags is illustrated. The tag includes in sequence from top to bottom: a printed ink layer 240 and a first substrate forming the optical part 20, a magnetic element layer 260 and a second substrate forming the magnetic part 30 and the mounting layer 40 backed by a removable waxed paper layer 280. The waxed paper layer 40 is removed when the tags are affixed to product surfaces.

It will be appreciated that modifications can be made to embodiments of the invention described in the foregoing without departing from the scope of the invention.

The invention claimed is:

1. A combination magnetic tag comprising an optical part and a magnetic part, the optical part including a plurality of optical elements for conveying an optical code and the magnetic part including a plurality of magnetic elements for conveying a magnetic code, wherein at least a part of the optical code, and at least part of the magnetic code are arranged to mutually correlate, the optical code including product and/or serial number information, said information being represented on the tag only in encoded form, the optical code being decodable using the magnetic code whereby comparing said at least part of the read magnetic code data and said at least part of the decoded optical code data determines whether or not the tag or tagged entity is authentic.

2. A tag according to claim 1, wherein said at least part of the optical code is identical to said at least part of the magnetic code.

3. A tag according to claim 1, wherein part of the optical code is decodable using the magnetic code to a provide the decoded product identifier and/or a product serial number.

4. A tag as claimed in claim 1, wherein said at least part of the optical code is derived from said at least part of the magnetic code using a mapping function.

5. A tag as claimed in claim 1, wherein the mapping function is a function of at least one magnetic element parameters, the group of parameters including the magnetic elements angular orientation, element coercivities and element dipole lengths.

6. A tag according to claim 1, wherein the optical elements comprise one or more of bar code elements and 3-dimensionally disposed dot elements.

7. A tag according to claim 1, wherein the magnetic elements comprise one or more of magnetic layers and magnetic wires.

8. A tag according to claim 1, wherein the magnetic elements are substantially randomly distributed on the tag.

9. A tag according to claim 8, wherein the magnetic elements are randomly distributed with respect to their angular orientation, length and coercivity.

10. A tag according to claim 1, wherein the magnetic elements are spatially regularly disposed on the tag.

11. A tag according to claim 1, wherein the magnetic elements are fabricated from magnetically soft material susceptible to magnetic saturation when magnetically interrogated.

12. A tag according to claim 1, wherein the optical elements appear multicolored.

13. A tag according to claim 1, wherein the magnetic and optical elements are formed onto one or more substrates comprising one or more of plastics material and wood-based material.

14. A tag according claim 1, wherein the magnetic code is encoded using a private key of a public-private key pair to generate the optical code.

15. A combination magnetic tag comprising an optical part and a magnetic part, the optical part including a plurality of optical elements for conveying an optical code and the magnetic part including a plurality of magnetic elements for conveying a magnetic code, wherein at least a part of the optical code and at least part of the magnetic code are arranged to mutually correlate, the optical code including product and/or serial number information, said information being represented on the tag only in encoded form, at least part of the optical code being uniquely derived using at least part of the magnetic code whereby correlating the read magnetic code with the decoded optical code data is used to determine whether or not the tag or tagged entity is authentic.

16. A combination magnetic tag comprising an optical part and a magnetic part, the optical part including a plurality of optical elements for conveying an optical code and the magnetic part including a plurality of magnetic elements for conveying a magnetic code, wherein at least part of the magnetic code is encoded using a private key of a public-private key pair to generate at least part of the optical code, the at least part of the optical code and the magnetic code being mutually complementary for verifying authenticity of the tag or tagged entity.

17. A method of interrogating a tag according to claim 1, the method including the steps of:
 (a) magnetically interrogating the tag to read its magnetic code;
 (b) optically interrogating the tag to read its optical code;
 (c) correlating at least part of the read magnetic code with at least part of the read optical code to determine correspondence therebetween and thereby establish whether or not the tag is authentic and
 (d) decoding the optical code using at least part of the magnetic code to derive decoded product and/or serial number information, said information being represented on the tag only in encoded form.

18. A method of interrogating a tag according to claim 1, the method including the steps of:
 (a) magnetically interrogating the tag to read its magnetic code;
 (b) optically interrogating the tag to read its optical code; and
 (c) decoding the read optical code using the magnetic code to generate decoded optical data and then correlating the read magnetic code with at least part of the decoded optical data to determine correspondence therebetween and thereby establish whether or not the tag or tagged entity is authentic.

19. A method of fabricating a tag according to claim 1, the method including the steps of:
 (a) providing a plurality of substrates in continuous form;
 (b) depositing magnetic elements onto one of the strands to form a magnetic strand;

(c) bonding other of the strands to the magnetic strand to form a composite strand;

(d) severing the composite strand into individual tags;

(e) magnetically interrogating the individual tags to determine their corresponding magnetic codes;

(f) printing onto the individual tags optical codes at least part of which correspond to and/or are correlatable with their magnetic codes.

20. A method according to claim 19, wherein, in step (b), the magnetic elements are randomly deposited.

21. A method according to claim 20, wherein the magnetic elements are randomly distributed with respect to their angular orientations, their coercivities and their lengths.

22. An apparatus for manufacturing a tag according to claim 1, comprising
(a) a device for providing a plurality of substrates in continuous form;
(b) a depositing device for depositing magnetic elements onto one of the strands to form a magnetic strand;
(c) a bonding mechanism for bonding other of the strands to the magnetic strand to form a composite strand;
(d) a severing mechanism for severing the composite strand into individual tags;
(e) an interrogator for magnetically interrogating the individual tags to determine their corresponding magnetic codes;
(f) a printer for printing onto the individual tags optical codes at least part of which correspond to and/or are correlatable with their magnetic codes; the optical codes including product and/or serial number information, said information being represented on the tags only in encoded form.

23. A combination magnetic tag comprising an optical part and a magnetic part, the optical part including a plurality of optical elements for conveying an optical code and the magnetic part including a plurality of magnetic elements for conveying a magnetic code, wherein at least a part of the optical code and at least part of the magnetic code are arranged to mutually correlate, the optical code including product and/or serial number information, said information being represented on the tag only in encoded form, said at least part of the optical code being solely derived from, and being decodable using, the magnetic code whereby comparing said at least part of the read magnetic code data and said at least part of the decoded optical code data determines whether or not the tag or tagged entity is authentic.

24. A tag according to claim 23, wherein the optical code is identical to said the magnetic code.

25. A tag according to claim 23, wherein the optical code includes a product identifier and/or a product serial number, the part of the optical code relating to the product identifier and/or product serial number being derived solely using the magnetic code.

26. A tag as claimed in claim 23, wherein the whole of the optical code is derived solely from said magnetic code using a mapping function.

27. A combination magnetic tag comprising an optical part and a magnetic part, the optical part including a plurality of optical elements for conveying an optical code and the magnetic part including a plurality of magnetic elements for conveying a magnetic code, wherein at least a part of the optical code and at least part of the magnetic code are arranged to mutually correlate, the optical code being decodable using the magnetic code whereby comparing said at least part of the read magnetic code data and said at least part of the decoded optical code data determines whether or not the tag or tagged entity is authentic.

* * * * *